(12) United States Patent
Kwok

(10) Patent No.: US 8,294,445 B2
(45) Date of Patent: Oct. 23, 2012

(54) SWITCHING VOLTAGE REGULATOR WITH FREQUENCY SELECTION

(75) Inventor: Sai C. Kwok, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/327,990

(22) Filed: Dec. 4, 2008

(65) Prior Publication Data

US 2010/0141233 A1 Jun. 10, 2010

(51) Int. Cl.
*H03G 5/24* (2006.01)
*H03G 5/28* (2006.01)

(52) U.S. Cl. ......... 323/283; 323/224; 323/351; 323/284

(58) Field of Classification Search .......... 323/224, 323/280–285, 351, 354
See application file for complete search history.

(56) References Cited

U.S. PATENT DOCUMENTS

| | | | | |
|---|---|---|---|---|
| 4,580,107 A | * | 4/1986 | Caldwell et al. | 331/10 |
| 4,870,699 A | * | 9/1989 | Garner et al. | 455/76 |
| 4,879,758 A | * | 11/1989 | DeLuca et al. | 455/296 |
| 5,150,361 A | * | 9/1992 | Wieczorek et al. | 370/311 |
| 5,363,419 A | * | 11/1994 | Ho | 375/376 |
| 5,773,966 A | * | 6/1998 | Steigerwald | 323/284 |
| 6,204,649 B1 | | 3/2001 | Roman | |
| 7,130,602 B2 | * | 10/2006 | Ciccarelli | 455/240.1 |
| 7,176,669 B2 | | 2/2007 | Ueda | |
| 7,218,531 B2 | | 5/2007 | Shuey et al. | |
| 7,312,664 B2 | * | 12/2007 | Loke et al. | 331/16 |
| 7,323,944 B2 | * | 1/2008 | Florescu et al. | 331/14 |
| 7,362,191 B2 | | 4/2008 | Chen et al. | |
| 2005/0218871 A1 | * | 10/2005 | Kang et al. | 323/265 |
| 2006/0055468 A1 | * | 3/2006 | Hallivuori et al. | 331/16 |
| 2006/0229024 A1 | | 10/2006 | Vishakhadatta | |

FOREIGN PATENT DOCUMENTS

| | | |
|---|---|---|
| JP | 11332230 | 11/1999 |
| JP | 2006094656 | 4/2006 |
| WO | WO0219551 | 3/2002 |
| WO | WO2004036331 | 4/2004 |
| WO | WO2004040743 | 5/2004 |
| WO | WO2004042937 | 5/2004 |
| WO | WO2005099109 A1 | 10/2005 |

OTHER PUBLICATIONS

International Search Report and Written Opinion—PCT/US2009/066882—International Search Authority—European Patent Office—May 12, 2010.

* cited by examiner

*Primary Examiner* — Bao Q Vu
*Assistant Examiner* — Nusrat Quddus
(74) *Attorney, Agent, or Firm* — S. Hossain Beladi

(57) ABSTRACT

Techniques for mitigating interference from a switching voltage regulator by intelligently varying the switcher frequency of the switching voltage regulator are provided. In one aspect, the switcher frequency is set by adjusting a frequency setting input to a programmable clock divider. In a further aspect, a processor drives a programmable clock divider which receives a value representative of a dividing factor by which to divide a reference clock frequency signal to generate a desired switcher frequency for the switching voltage regulator. Values of the programmable clock divider are selectively varied to achieve optimal performance and mitigate the effect of switcher frequency spurious content for a given operating condition or conditions.

33 Claims, 10 Drawing Sheets

SWITCHING VOLTAGE REGULATOR WITH FREQUENCY SELECTION

TECHNICAL FIELD

The present disclosure relates generally to integrated circuits, and more specifically to switching voltage regulators in wireless communication devices.

BACKGROUND

Wireless communication devices require a battery or external DC power supply for a power source. Within a wireless communication device, there are integrated circuits (ICs). These ICs typically operate at a much lower DC voltage than either a battery or an external DC power supply attached to the wireless communication device. To facilitate integrated circuits operation at a low operating voltage, a switching voltage regulator is usually required to convert either an external DC power supply or battery voltage to the integrated circuits lower supply voltage.

A switching voltage regulator provides the highest power efficiency when the difference between the battery voltage (VBAT) and the integrated circuits supply voltage (VDD) is more than a couple hundred millivolts. In one particular example, the battery is composed of a Li-ion cell with a 3.6V nominal voltage and the integrated circuits operate at 1.8V. Therefore, the difference between the battery voltage and the integrated circuits voltage is 3.6 V-1.8 V or 1.8 V. In this particular example, a switching voltage regulator is strongly preferred over a linear regulator. A linear regulator would experience the full 1.8V drop between the battery and the load. The power dissipated by a linear regulator is equal to 1.8V*IDD (the load current of the integrated circuits). As such, a switching voltage regulator may dissipate only 10% of the energy used by the integrated circuit (over a wide range of load current), whereas a linear regulator would dissipate 100% of the energy used by the integrated circuit regardless of the load current. Switching voltage regulators are often used in wireless communication devices for this reason.

Switching voltage regulators may convert between a higher input voltage and a lower output voltage using one or more electronic switches in conjunction with energy storage devices (inductors or capacitors) to transfer energy between a higher external DC power supply voltage and a lower integrated circuit voltage.

By way of background, the ratio between a switching voltage regulator output voltage (Vo) and a switching voltage regulator input voltage (Vi) sets the duty cycle (D) for a switching voltage regulator (D=Vo/Vi). A switching voltage regulator frequency is dictated by the output voltage ripple requirement, the size of the series inductor and load filtering capacitor within a switching voltage regulator, output DC load current, and desired power efficiency of a switching voltage regulator. In the case where the switching voltage regulator is coupled to other radio frequency (RF) transceiver circuits, a switcher frequency of the switching voltage regulator can cause interference with other such components in the wireless communication device. This interference appears as voltage ripple on the VDD and ground connections of the RF transceiver circuit. This voltage ripple is composed of discrete frequency components. Each frequency component is a harmonic of the switcher frequency of the switching voltage regulator. A power level of each harmonic is dependent on (i) the duty cycle of the switcher frequency of the switching voltage regulator, (ii) the degree of capacitive filtering of the output voltage, as well as (iii) the type of coupling between the switching voltage regulator and the RF transceiver circuit.

Radio frequency (RF) voltage-controlled oscillators (VCOs) are typically embedded in a RF transceiver and function as local oscillator(s) (LOs) to up-convert or down-convert communication signals from/to baseband to/from RF. In a typical configuration with a switching voltage regulator either directly or indirectly coupled to the RF VCO, voltage ripple at the output of the switching voltage regulator may combine with a frequency tuning element voltage of the RF VCO to create frequency modulation (FM) on the RF VCO output at offsets equal to the harmonics of the switching voltage regulator switcher frequency. The switching voltage regulator induced FM on the RF VCO causes harmonic spurious content to appear at offsets from the fundamental output carrier frequency of the RF VCO.

This harmonic spurious content induced by the switching voltage regulator (directly or coupled on to the RF VCO) may interfere with the performance of a wireless communication device under certain operating conditions. For example, weak receive signal strength, the presence of external jammers at specific frequency offsets from a desired receive channel, and/or transmit leakage into a receive path in a full-duplex transceiver can all contribute to greater interference, in the presence of the switching voltage regulator, on the analog signals to be up- or down-converted to or from radio frequencies.

Known ways to reduce the effect of switcher frequency spurious content caused by the switching voltage regulator in a wireless communication devices include: (i) adjusting the frequency of the switching voltage regulator continuously using pulse width modulation, pulse density modulation, or frequency hopping; b) toggling between a switching voltage regulator and a linear regulator during receive only modes of the wireless communication transceiver; and (iii) moving the switching voltage regulator as far away (using shielding and differential signal paths for improved isolation) from sensitive VCO and other components, all of which introduce a level of design complexity or inefficient use of circuit board or integrated circuit area.

There is a need for improved ways to reduce the effect of interference from the switching voltage regulator in wireless communication devices without the drawbacks of conventional techniques.

SUMMARY

Techniques for mitigating interference from a switching voltage regulator by intelligently varying the switcher frequency of the switching voltage regulator are provided. In one aspect, the switcher frequency is set by adjusting a frequency setting input to a programmable clock divider. In a further aspect, a processor drives a programmable clock divider which receives a value representative of a dividing factor by which to divide a reference clock frequency signal to generate a desired switcher frequency for the switching voltage regulator. Values of the programmable clock divider are selectively varied to achieve optimal performance and mitigate the effect of switcher frequency spurious content for a given operating condition or conditions.

Various other aspects and embodiments of the disclosure are described in further detail below.

The summary is neither intended nor should it be construed as being representative of the full extent and scope of the present disclosure, which these and additional aspects will become more readily apparent from the detailed description, particularly when taken together with the appended drawings.

Figure 1:
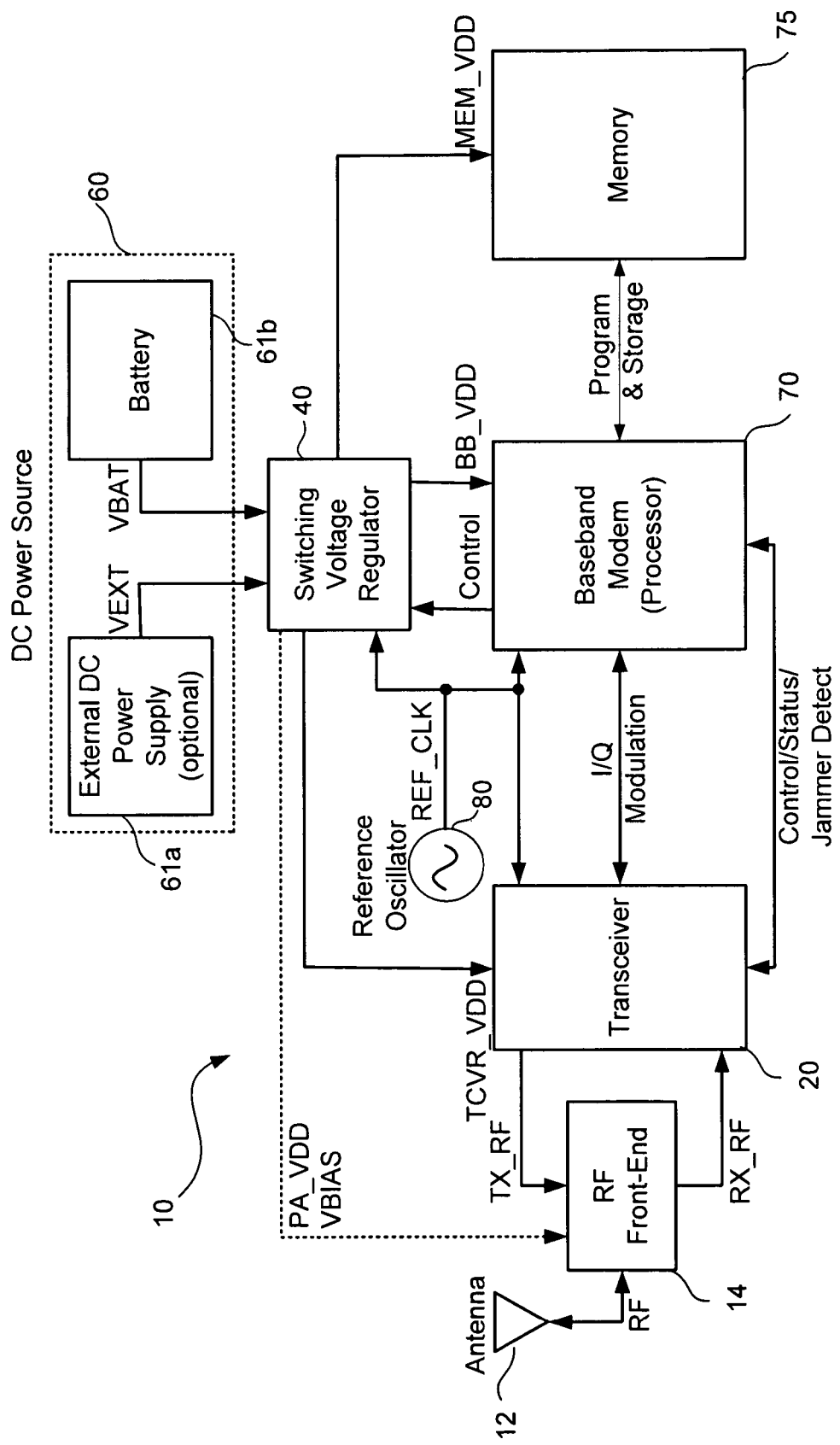
FIG. 1 is a block diagram of a wireless communication device.

To facilitate understanding, identical reference numerals have been used, where possible to designate identical elements that are common to the figures, except that suffixes may be added, when appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

The device described therein may be used for various wireless communication frequency bands such as cellular, PCS, and IMT and air-interfaces such as CDMA, TDMA, FDMA, OFDMA, and SC-FDMA. In addition to cellular, PCS or IMT network standards and frequency bands, this device may be used for local-area or personal-area network standards, WLAN, Bluetooth, & ultra-wideband (UWB).

FIG. 1 is a block diagram of a wireless communication device 10 in accordance with the present embodiment as shown. Wireless communication device 10 includes radio frequency (RF) antenna 12 connected to RF Front-End 14. RF Front-End 14 separates transmit and receive RF signal paths, and provides amplification and signal distribution. RF signals for transmit, TX_RF, and receive, RX_RF, are passed between transceiver 20 and RF Front-End 14.

Transceiver 20 is configured to down-convert a RX_RF signal from RF to a signal for baseband I/Q demodulation by processor 70, which may be a baseband modem or the like. Transceiver 20 is similarly configured to up-convert a signal from processor 70, using baseband I/Q modulation, to a TX_RF signal. Signals to be up-converted and down-converted from/to baseband I/Q modulation are shown connected between transceiver 20 and processor 70.

Memory 75 stores processor programs and data and may be implemented as a single integrated circuit (IC), as shown.

Processor 70 is configured to demodulate incoming baseband receive I/Q signals, encode and modulates baseband transmit I/Q signals, and run applications from storage, such as memory 75, to process data or send data and commands to enable various circuit blocks, all in a known manner.

In addition, processor 70 generates control signals to transceiver 20 through a data bus, serial bus, or a dedicated set of signals. Such control signals may include, for example, turning transceiver 20 on and off, measuring received signal strength, setting transmit RF signal power or receive signal path gains, changing RF channels, detecting receiver signal jammers, and switching transmit/receive signal blocks between high power and power saving modes.

Processor 70 is also configured to read the state of transceiver 20, and at the same time also receive one or more interrupt signals (not shown) from transceiver 20. Interrupt signals are used to initiate commands and algorithms between transceiver 20 and processor 70.

It should be appreciated that the general operation of processor 70, transceiver 20, and memory 75 are well known and understood by those skilled in the art, and that various ways of implementing the associated functions are also well known, including providing or combining functions across fewer integrated circuits (ICs), or even within a single IC.

Processor 70, transceiver 20, memory 75, and RF Front-End 14 of FIG. 1 typically require a DC power supply to operate. DC power is conventionally provided from a generic DC power source 60. DC power source 60 may consist of either an external DC power supply 61a (output voltage labeled VEXT) or a battery 61b (output voltage labeled VBAT). Either output voltage VEXT from DC power supply 61a or the output voltage VBAT from battery 61b drive a supply voltage into switching voltage regulator 40. Switching voltage regulator 40 is configured to convert supply voltage of VEXT or VBAT to individual supply voltages for powering each of processor 70 (BB_VDD), transceiver 20 (TCVR_VDD), memory 75 (MEM_VDD), and RF Front-End 14 (PA_VDD and VBIAS). Switching voltage regulator 40 may also provide supply voltages to other blocks as necessary (not shown).

Switching voltage regulator 40 is configured to convert between a higher input voltage and a lower output voltage by toggling on and off, at a switcher frequency (hereafter "Fsw"), one or more switches in conjunction with energy storage devices (inductors or capacitors) to transfer energy between the higher input voltage and lower output voltage.

In one aspect, processor 70 controls the switcher frequency, Fsw, of switching voltage regulator 40, depending on one or more conditions of transceiver 20. As previously described in the background of the disclosure, switching voltage regulator 40 may interfere with transceiver 20 operation.

Transceiver 20 conditions include an operating mode (CDMA, TDMA, FDMA, OFDMA, SC-FDMA, GPS, . . . ) with associated receive signal bandwidth, operating frequency band (US cellular, US PCS, IMT, . . . ), and receive jamming detection circuit (jammer present, jammer power level, and jammer frequency offset from desired receive signal).

Within wireless communication device 10, switching voltage regulator 40, transceiver 20, and processor 70 share a reference clock oscillator 80. Reference clock oscillator 80 generates a reference clock frequency signal, REF_CLK, as will be shown in subsequent FIGS. 2, 3, and 6.

RF Front-End 14, transceiver 20, switching voltage regulator 40, processor 70, memory 75, and reference clock oscillator 80 may reside on common silicon, separate silicon on a common package substrate, as separate packaged devices, or combinations thereof where appropriate from a functional or circuit design perspective.

Figure 2:
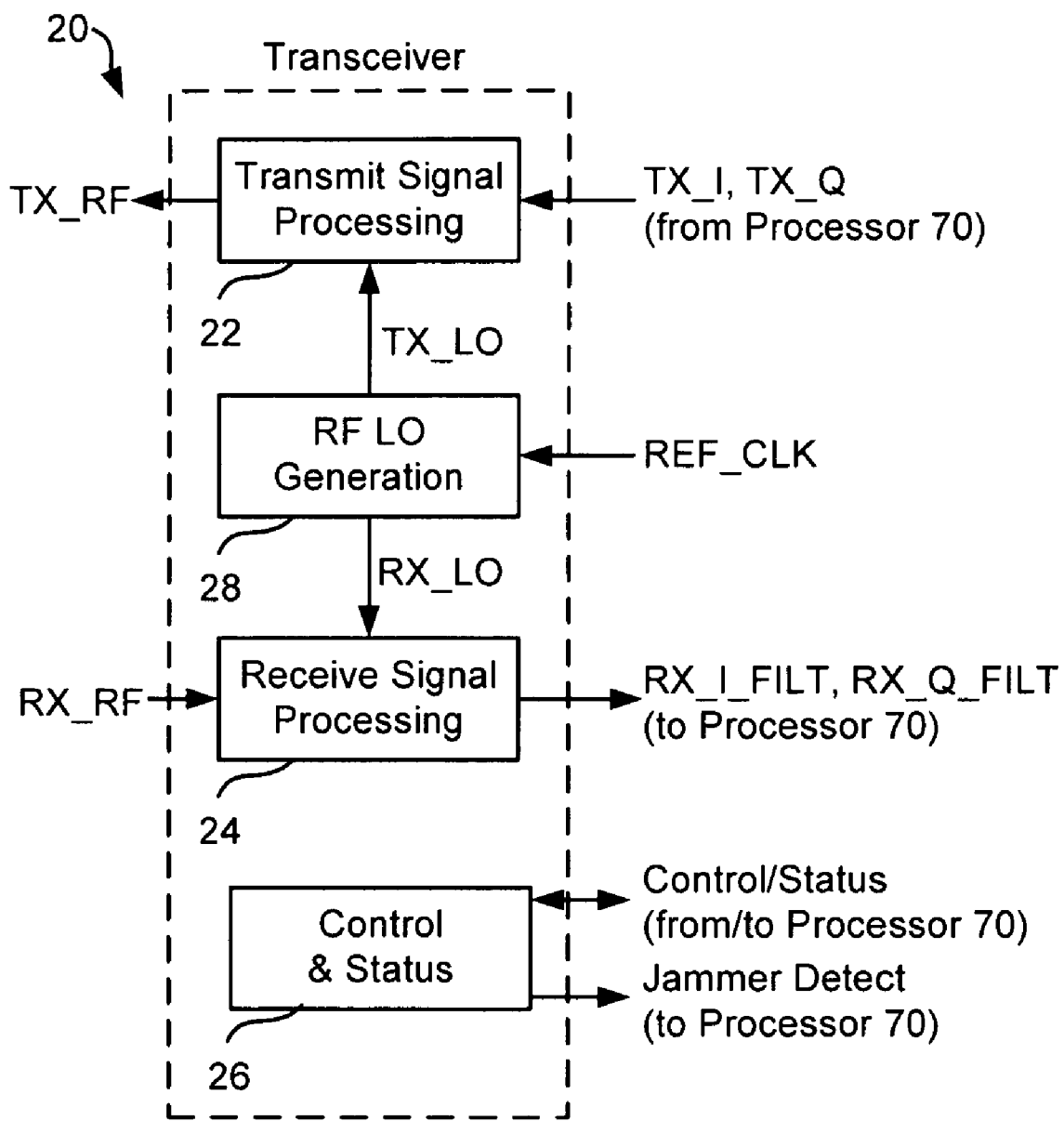
FIG. 2 is a block diagram of a radio frequency (RF) transceiver.

FIG. 2 is a block diagram of a radio frequency (RF) transceiver (transceiver 20) of FIG. 1 in accordance with the present embodiment as shown. Transceiver 20 includes transmit signal processing block 22, receive signal processing block 24, RF local oscillator (RF LO) generation block 28, and control and status block 26. Control and status block 26 provides digital control logic to/from processor 70 including a jammer detect signal. REF_CLK, from reference clock oscillator 80, feeds into RF LO generation block 28.

Transceiver 20, while shown with just one transmit and receive signal processing block, may also exist with any combination of multiple receive blocks, multiple transmit blocks, or any number of possible transmit and receive signal processing block configurations. For example, transmit signal processor block 22 and receive signal processing block 24 are shown as separate functional blocks but may be combined to some extent in a half duplex radio device mode. Similarly, RF LO generation block 28, while logically shown as a separate common block disposed between transmit signal processing block 22 and receive signal processing block 24, other configurations are contemplated. Control and status block 26 can be similarly reconfigured without departing from the scope of the preferred embodiments described herein.

Figure 3:
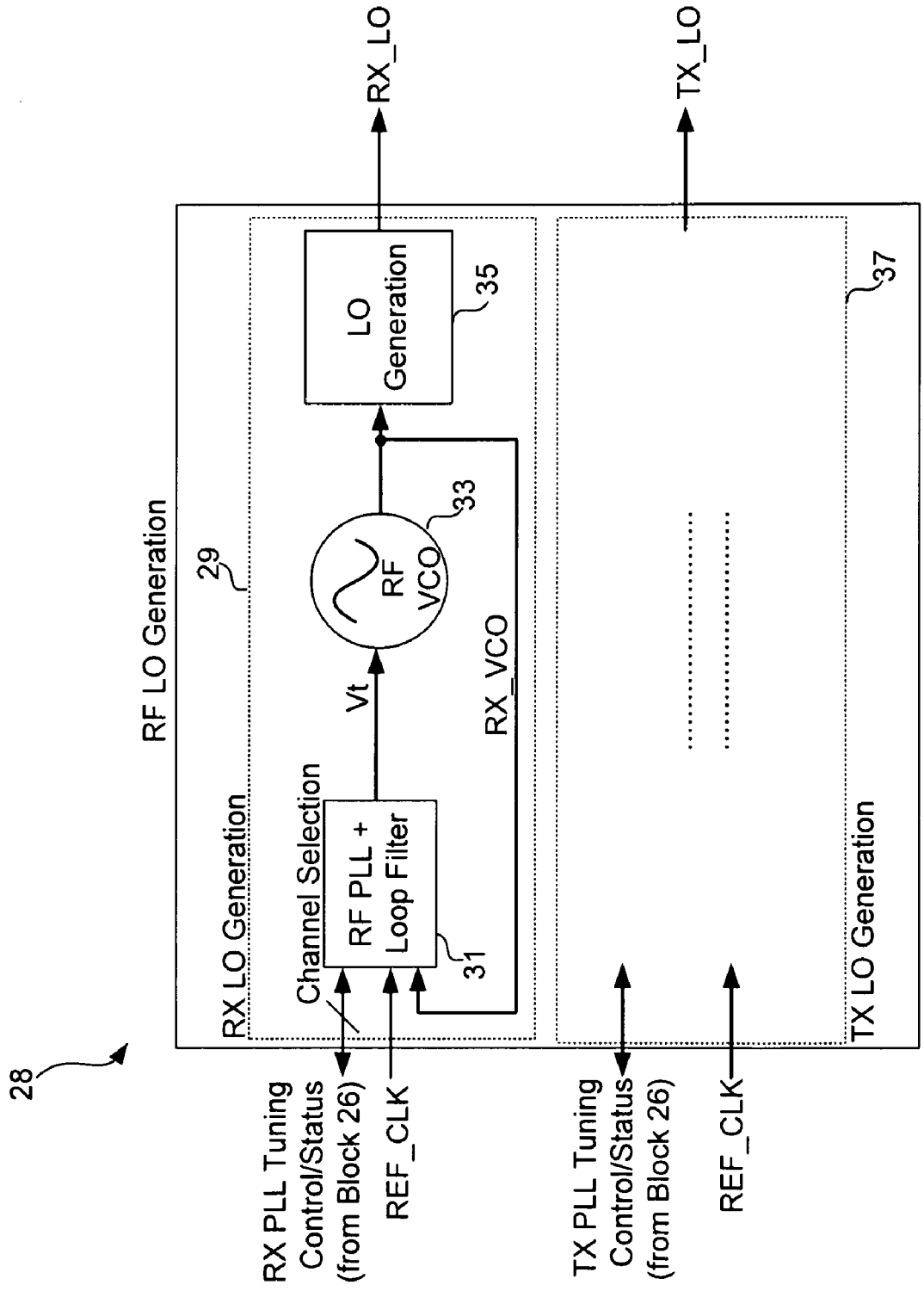
FIG. 3 is a diagram of a radio frequency (RF) local oscillator (LO) generation block.

FIG. 3 is a diagram of a radio frequency (RF) local oscillator (LO) generation block 28 of FIG. 2 in accordance with the present embodiment as shown. RF LO generation block 28 includes a RX LO generation block 29 and a TX LO generation block 37. RX LO generation block 29 includes a channel selection tuning block 31 comprising a RF PLL and loop filter. Channel selection tuning block 31 compares REF_CLK from reference clock oscillator 80 to output signal, RX_VCO, from RF VCO 33 to lock RF VCO 33 to a desired frequency. The output, Vt, from channel selection tuning block 31 is an analog control signal for tuning the frequency of output signal RX_VCO of RF VCO 33.

The output signal RX_VCO is further processed by LO generation block 35 and frequency converted to a desired receive RF channel frequency, RX_LO. LO generation block 35 may be implemented using frequency dividers, frequency mixers, switches, or a combination of all three types of elements to create a variety of frequency multiplication or division ratios between signals RX_VCO and RX_LO. The RX_LO signal frequency is equal to the desired RX RF channel frequency in a particular operating frequency band (US cellular, US-PCS, IMT, GPS, etc). RX_LO signal is connected to the receive signal processing block 24 of FIG. 2.

An equivalent block for TX LO generation 37 is not shown for brevity. It should be readily understood that a similar block as shown for RX LO generation block 29 may be utilized for TX LO generation block 37 and as many LO generation blocks as required for multiple signal processing blocks of both RX and TX or RX only.

Figure 4:
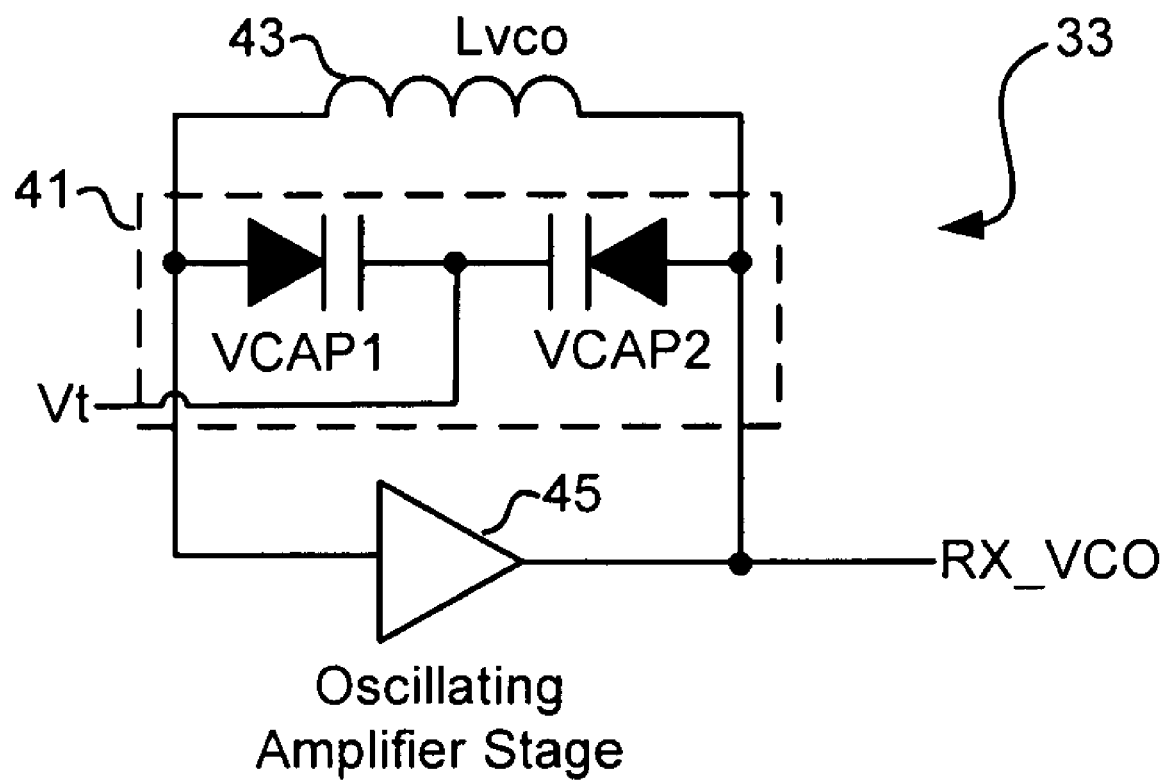
FIG. 4 is a schematic diagram of a radio frequency voltage-controlled oscillator.

FIG. 4 is a schematic diagram of the radio frequency voltage-controlled oscillator, RF VCO 33, of FIG. 3 in accordance with the present embodiment as shown. RF VCO 33 includes a fixed inductor Lvco 43 in parallel with two varactor elements 41 (VCAP1 and VCAP2) to shift the frequency of output signal RX_VCO. This frequency (in radians/sec) is equal to $$\sqrt{\frac{1}{Lvco * Cvcap}},$$

where $C_{vcap}$ is the total capacitance of the two varactor elements 41 (VCAP1 and VCAP2). Frequency tuning is achieved by varying the total capacitance by adjusting the output, Vt, from channel selection tuning block 31 which is input across VCAP1 and VCAP2. The output of RF VCO 33, RX_VCO, is then input back to channel selection tuning block 31 and into LO generation block 35, as shown in FIG. 3.

The circuit shown in FIG. 4 may apply across as many RF VCOs as required for multiple paths of both RX and TX. Alternatively one RF VCO may cover multiple modes and operating bands as long as simultaneous operation in multiple frequency bands is not required. Other circuit topologies are known that can shift the output frequency of an RF VCO, but are functionally equivalent.

Figure 5:
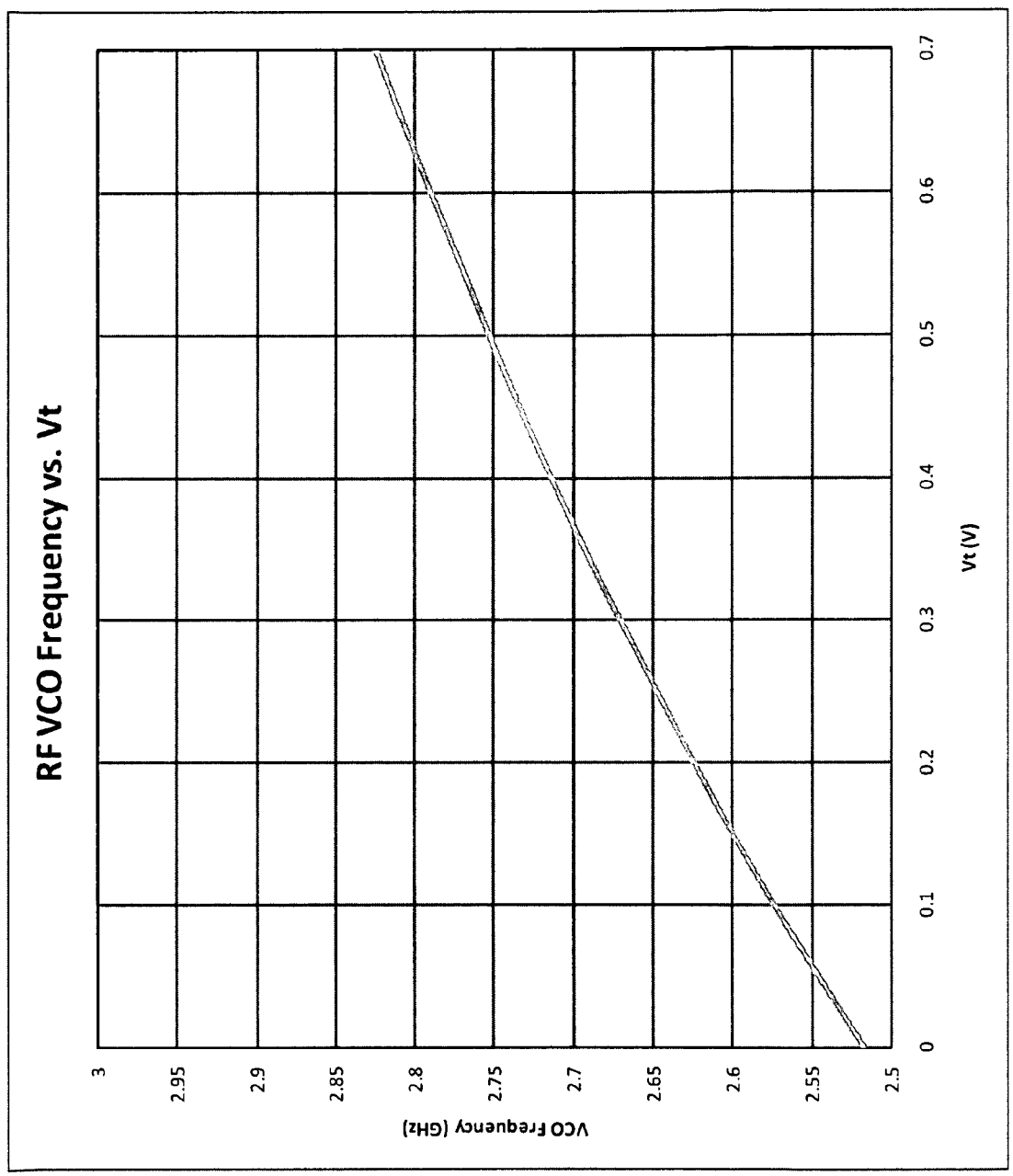
FIG. 5 is a graphical illustration of RF VCO output frequency vs. RF VCO tuning voltage (Vt).

FIG. 5 is a graphical illustration of RF VCO output frequency vs. tuning voltage (Vt) of FIG. 4 in accordance with the present embodiment as shown. In this example design, the frequency tuning range of RF VCO 33 is continuously adjusted by tuning voltage, Vt, between 0 and 0.7 volts DC. The Vt tuning slope (Kv=MHz/V) and absolute frequency tuning range may be altered by changing the circuit topology and element values, but are functionally equivalent.

As is evident in FIG. 5, the Vt tuning slope (Kv=MHz/V) is very large (approximately KV=5,000 MHz/V). As a result of the large Vt tuning slope, RF VCO 33 is very susceptible to noise on the tuning voltage, Vt. For example, if 1 uV (one millionth of a volt) of sinusoidal ripple at 2 MHz (Fsw) is coupled onto Vt with 0.2 V DC tuning voltage, the RF VCO 33 output will be composed of a fundamental frequency of 2.57 GHz (as shown in the graph for Vt=0.2 V DC) with spectral components spaced every 2 MHz (spurious content).

The relative amplitude of the spurious content may be calculated using the Bessel function Jn(beta) for frequency modulation (FM) of RF VCO 33, where n is equal to the harmonic index (1, 2, 3 . . . ) of the switcher frequency, Fsw, for the switching voltage regulator 40 and beta is the modulation index (beta=Kv*ripple/Fsw). For the values of Kv=5000 MHz/V, voltage ripple=1 uV, and Fsw=2 MHz, the first spectral component (n=1) at 2 MHz offset from the RF VCO fundamental frequency, will be −58 dBc.

As more voltage ripple couples onto Vt, the amplitude of the spurious content measured on the RF VCO 33 output will also increase in relative amplitude. As will be shown subsequently in FIGS. 7 and 8, this spurious content may degrade transceiver 20 radio performance under different operating conditions.

Figure 6:
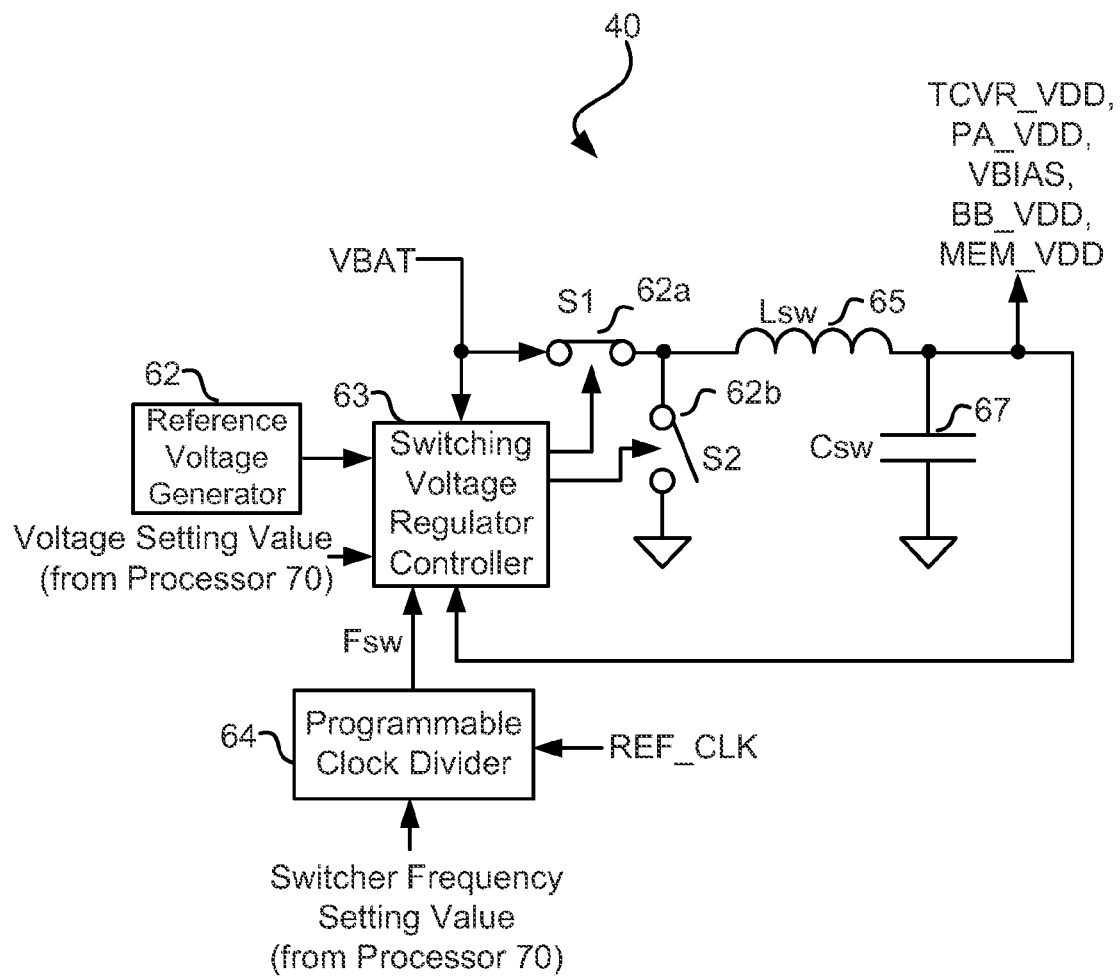
FIG. 6 is a block diagram of a switching voltage regulator in accordance with a preferred embodiment.

FIG. 6 is a schematic diagram of a switching voltage regulator 40 in accordance with a preferred embodiment of FIG. 1. Switching voltage regulator 40 includes a voltage source input, VBAT, from power source 61b of FIG. 1, and voltage output, TCVR_VDD for transceiver 20, PA_VDD and VBIAS for RF Front-End 14, BB_VDD for processor 70, and MEM_VDD for memory 75 of FIG. 1. An alternate input voltage VEXT may also be used if selected by either switcher 40 or processor 70 in FIG. 1. Individual output voltages such as PA_VDD, VBIAS, BB_VDD and MEM_VDD may be generated separately with additional switching voltage regulators if different supply voltages are required.

Between switching voltage regulator 40 input and output, VEXT and TCVR_VDD (along with PA_VDD, VBIAS, BB_VDD, and MEM_VDD) respectively, are switches 61a and 62a and 62b along with a switching voltage regulator controller 63, a programmable clock divider 64, a series inductor Lsw 65, and a shunt filtering capacitor Csw 67.

Switching voltage regulator controller 63 compares the output voltage TCVR_VDD (along with PA_VDD, VBIAS, BB_VDD, and MEM_VDD) to a programmable voltage setting value based on a reference voltage generator 62 output voltage and adjusts the duty cycle of S1 and S2 such that the output voltage, TCVR_VDD (along with PA_VDD, VBIAS, BB_VDD, and MEM_VDD), converges to the programmed voltage setting value. The programmed voltage setting value is set by processor 70 or can be hardware configured to a fixed value internal to switching voltage regulator 40. The switcher frequency, Fsw, to the switching voltage regulator controller 63, is set by a switcher frequency setting value for programmable clock divider 64.

Programmable clock divider 64 may be an integer frequency divider between REF_CLK (from reference clock oscillator 80 in this example), and the switcher frequency, Fsw, used to control switches 62a and 62b. In one embodiment, REF_CLK output frequency is 19.2 MHz and the programmable clock divider 64 is set between 3 different frequency setting values (divide by 6, 7, or 8) depending on the process shown subsequently in FIG. 9.

Switching voltage regulator 40 is coupled to transceiver 20 directly via the supply voltage TCVR_VDD as shown in FIGS. 1 and 6. The switcher frequency, Fsw, of the switching voltage regulator 40, may interfere with the performance of transceiver 20. The interference appears as voltage ripple on TCVR_VDD. The voltage ripple is composed of discrete frequency components. Each frequency component is a harmonic of the switcher frequency, Fsw, of the switching voltage regulator 40. A power level of each harmonic is dependent on (i) the duty cycle of the switcher frequency, Fsw, of the switching voltage regulator 40, (ii) the degree of capacitive filtering of the output voltage TCVR_VDD, as well as (iii) the method of coupling between TCVR_VDD and sensitive circuits within transceiver 20.

As previously mentioned in reference to FIG. 5, one of the most sensitive circuits within transceiver 20 is RF VCO 33. Voltage ripple at the output of the switching voltage regulator 40 may combine with the tuning voltage, Vt, of RF VCO 33 to create frequency modulation (FM) of the RF VCO 33 output, RX_VCO, at frequency offsets equal to the harmonics of the switcher frequency, Fsw, of switching voltage regulator 40.

The switcher frequency, Fsw, of switching voltage regulator 40 (directly or coupled to RF VCO 33) may interfere with the performance of wireless communication device 10 under certain operating conditions. Techniques for adjustably selecting operating switcher frequency for the switching voltage regulator 40, shown in FIG. 1 and FIG. 6. in accordance with the present preferred embodiments, shall now be described for different operating conditions.

In the case where switching voltage regulator 40 is part of wireless communication device 10 of FIG. 1, the first operating condition is based on a current operating technology mode (GSM, CDMA, WCDMA, etc). Each technology mode has associated therewith a previously determined RF channel bandwidth (Fch). For GSM, the RF channel bandwidth (Fch_gsm) is 200 kHz. For CDMA, the RF channel bandwidth (Fch_cdma) is 1.23 MHz. For WCDMA, the RF channel bandwidth (Fch_wcdma) is 3.84 MHz, and so on.

In an aspect herein, the switcher frequency, Fsw, of the switching voltage regulator 40, associated with a given technology mode, is adjusted such that it is greater than half the RF channel bandwidth (Fsw>Fch/2). This switcher frequency adjustment reduces or eliminates switcher voltage regulator 40 interference on transceiver 20 from appearing on the baseband analog receive signals (RX_I_FILT and RX_Q_FILT in FIG. 2) and transmit signals (TX_I, TX_Q of FIG. 2).

In the case of wireless communication device 10 operating in full duplex mode, setting the switcher frequency of switching voltage regulator 40 higher than half the RF channel bandwidth (Fsw>Fch/2) is particularly useful in mitigating interference. One example of full-duplex mode is where frequency separation between the transmit RF channel (at Ftx) and the receive RF channel (at Frx) is equal to D (D=Frx−Ftx) and transmit and receive RF channels are both active at the same instant. D is set based on the operating frequency band associated with wireless communication device 10. In a single frequency band wireless communication device 10, the RF operating band includes only one frequency band of interest for that technology mode (US cellular, US PCS, CDMA in the IMT band, etc.). In the case of a multi-frequency band wireless communication device 10 (e.g., US cellular, US PCS and/or CDMA (IMT) capability), the operating frequency band is one of several possible frequency bands. For US cellular, D=45 MHz. For US PCS, D=80 MHz. For CDMA in the IMT band, D=190 MHz, and so on.

In an ideal situation, the transmit RF channel (at Ftx) must not mix with spurious content (from switching voltage regulator 40), as it may create interference at the receive RF channel frequency (at Frx). The switcher frequency, Fsw, of switching voltage regulator 40 must, in fact, not fall within a range of frequencies such that D−Fch<N*Fsw<D+Fch where N*Fsw is the nearest integer switcher frequency harmonic to D. By selecting a switcher frequency in accordance with an aspect herein, interference from switching voltage regulator 40 on either the transmit RF channel and receive RF channel is mitigated.

Figure 7:
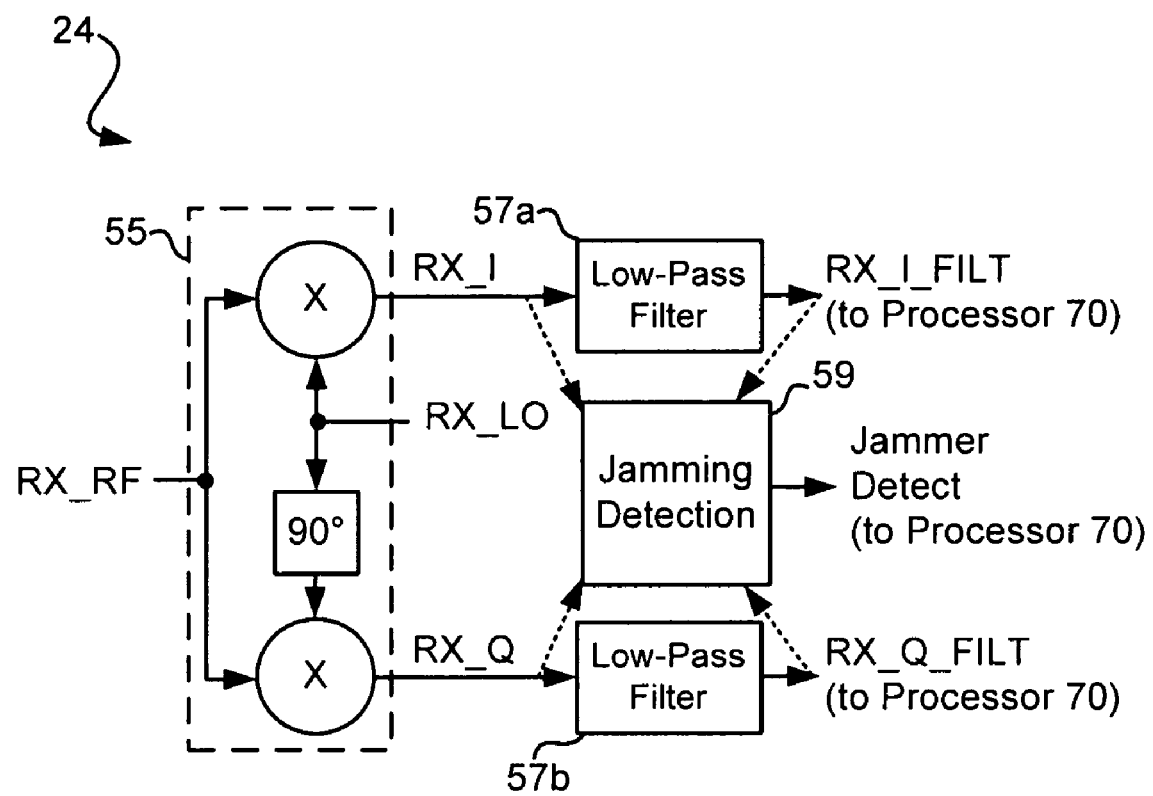
FIG. 7 shows a block diagram of the receive signal processing block of FIG. 2.

FIG. 7 is a block diagram of receive signal processing block 24 in FIG. 2 in accordance with the present embodiment as shown. Receive signal processing block 24 includes RX RF I/Q down-converter 55, a pair of baseband analog low-pass filters 57a and 57b, and jamming detection block 59. Alternative embodiments may include low-noise amplifiers, RF filtering, multiple RF bands, and various forms of gain control circuitry.

RX_RF signal from RF Front-End block 14 (of FIG. 1) is fed into I/Q down-converter 55 as well as out-of-RX band interference prior to down-converting the receive RF signal using a direct-conversion (RF to baseband) I/Q mixers within I/Q down-converter 55. The outputs of I/Q down-converter 55, RX_I and RX_Q, are filtered by low-pass filters 57a and 57b prior to further processing in either in analog (on either transceiver 20 or processor 70) or digital domain (after conversion with analog to digital converters on either transceiver 20 or processor 70). Although not shown in FIG. 7, low-pass filters 57a and 57b may include fixed or variable gain to adjust RX_I_FILT and RX_Q_FILT amplitude prior to analog to digital conversion in processor 70.

Jamming detection circuit 59 sends a jammer detect signal, which value communicates to processor 70 when jammers are present which are frequency offset from a selected receive channel. Jamming detection circuit 59 may take measurements in the baseband analog domain before or after analog low-pass filters 57a and/or 57b to detect the presence of jammers offset from the RX_I and RX_Q signals in frequency. Alternatively, jamming detection block 59 may be implemented in the digital domain in processor 70 or split between transceiver 20 and processor 70.

The presence of one or two jammers, in the RX_RF signal path at one or two different frequency offsets from the desired receive RF channel, may interfere with the desired RF channel when mixed with spurious content present on RX_VCO and RF_LO signals (of FIGS. 2-4). This undesired mixing product may fall within the receive signal bandwidth measured at baseband receive signal path (RX_I, RX_Q, RX_I_FILT, and RX_Q_FILT of FIG. 7).

In another aspect herein, the switcher frequency of the switching voltage regulator 40 is set so as to mitigate this interference in the baseband receive signal path when one or more jammers are present above a predefined and detectable threshold in the baseband receive signal path. The spurious content problem acting on receive signal processing block 24 as described above in connection with FIG. 2 and FIG. 7 may be graphically illustrated.

Figure 8:
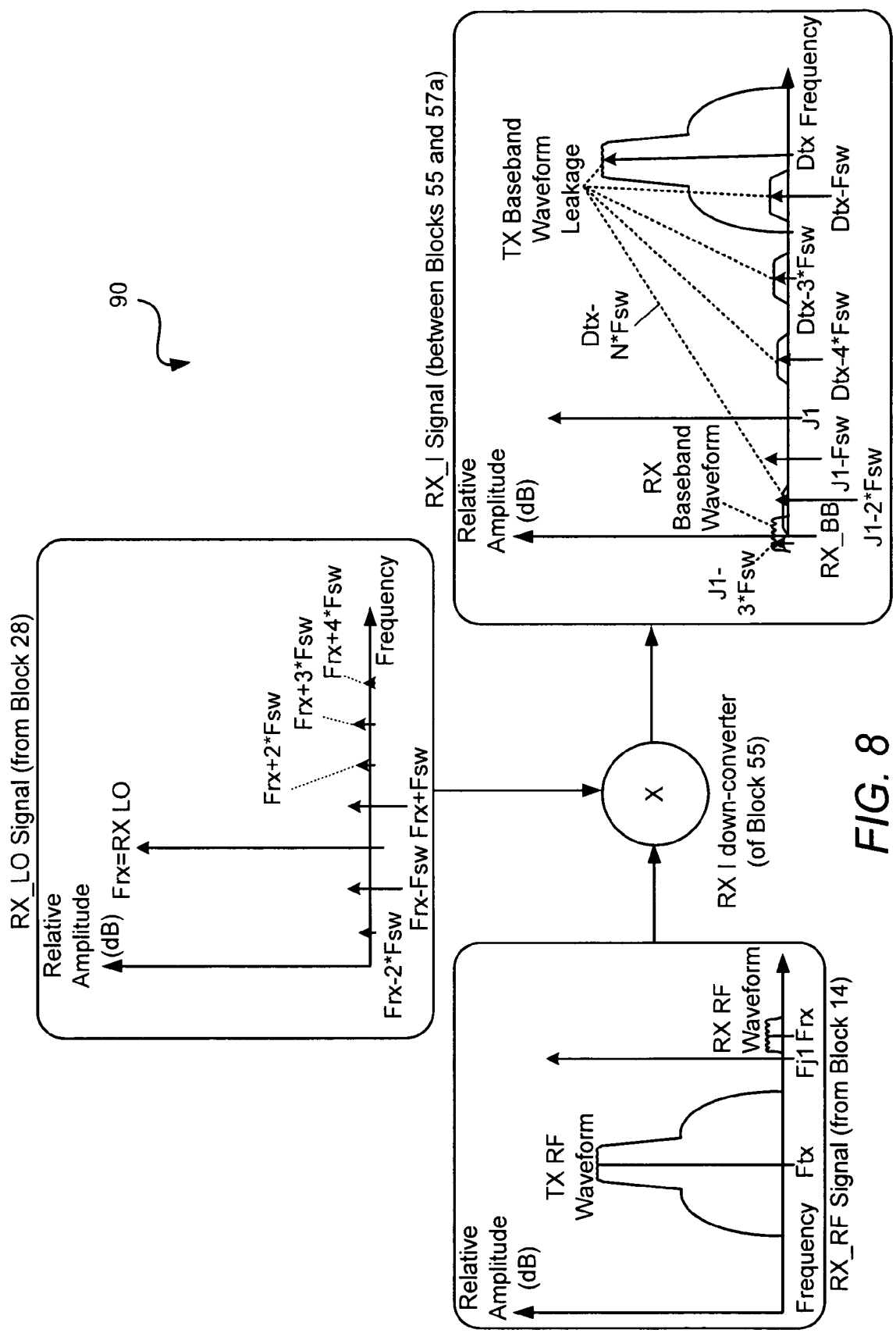
FIG. 8 is a graphical illustration showing the impact of interference from a switching voltage regulator on (i) RF LO output, (ii) transmit RF channel leakage, and (iii) receiver performance in the presence of jammers.

FIG. 8 is a graphical illustration showing the impact of interference from a switching voltage regulator on (i) RF_LO output, (ii) transmit RF channel leakage, and (iii) receiver performance in the presence of jammers for FIGS. 1-7 in accordance with the present embodiment as shown. Illustration 90 includes an amplified/filtered RX_RF signal input with receive signal at Frx, transmit signal leakage at Ftx, and a jammer signal at Fj1 (from block 53 of FIG. 7) as input to I/Q down-converter 55 (of FIG. 7). Illustration 90 also includes a RX_LO signal (from block 35 of FIG. 3) with switcher frequency spurious content at frequency offsets corresponding to N*Fsw (where N=−2, −1, +1, +2, +3, and +4) as a second input to I/Q down-converter 55 (of FIG. 7). Illustration 90 also includes a RX_J signal from the in-phase, or I down-converter of I/Q down-converter 55 of FIG. 7.

The illustrated RX_I signal shows the mixing products of RX_RF and RX_LO input signals at I/Q down-converter 55 baseband output. The desired receive baseband channel, RX_BB in the RX_I signal path, is centered at DC. At frequencies above the RX_BB signal bandwidth, there are spectral components at offsets for the jammer at J1 frequency and TX signal leakage at Dtx frequency. Additionally, there is spurious content that falls within the receive channel, RX_BB, specifically J1−3*Fsw and Dtx−N*Fsw (where N is an integer, N*Fsw is a harmonic of the switcher frequency of switching voltage regulator 40). The spurious content within the receive channel bandwidth cannot be filtered or removed prior to demodulating RX_BB signal and interferes with proper RX_BB demodulation by processor 70.

Depending on the frequency band offset between TX and RX frequencies (D), the switcher frequency (Fsw) of switching voltage regulator 40, and offset jammer frequencies (J1 in this instance), there may be multiple sources of receive signal processing interference as measured at the baseband output of the I/Q down-converter 55 (RX_I or RX_Q). By adjusting the switcher frequency of switching voltage regulator 40, Fsw, receive signal processing interference may be minimized for different operating conditions as explained in greater detail below.

Figure 9:
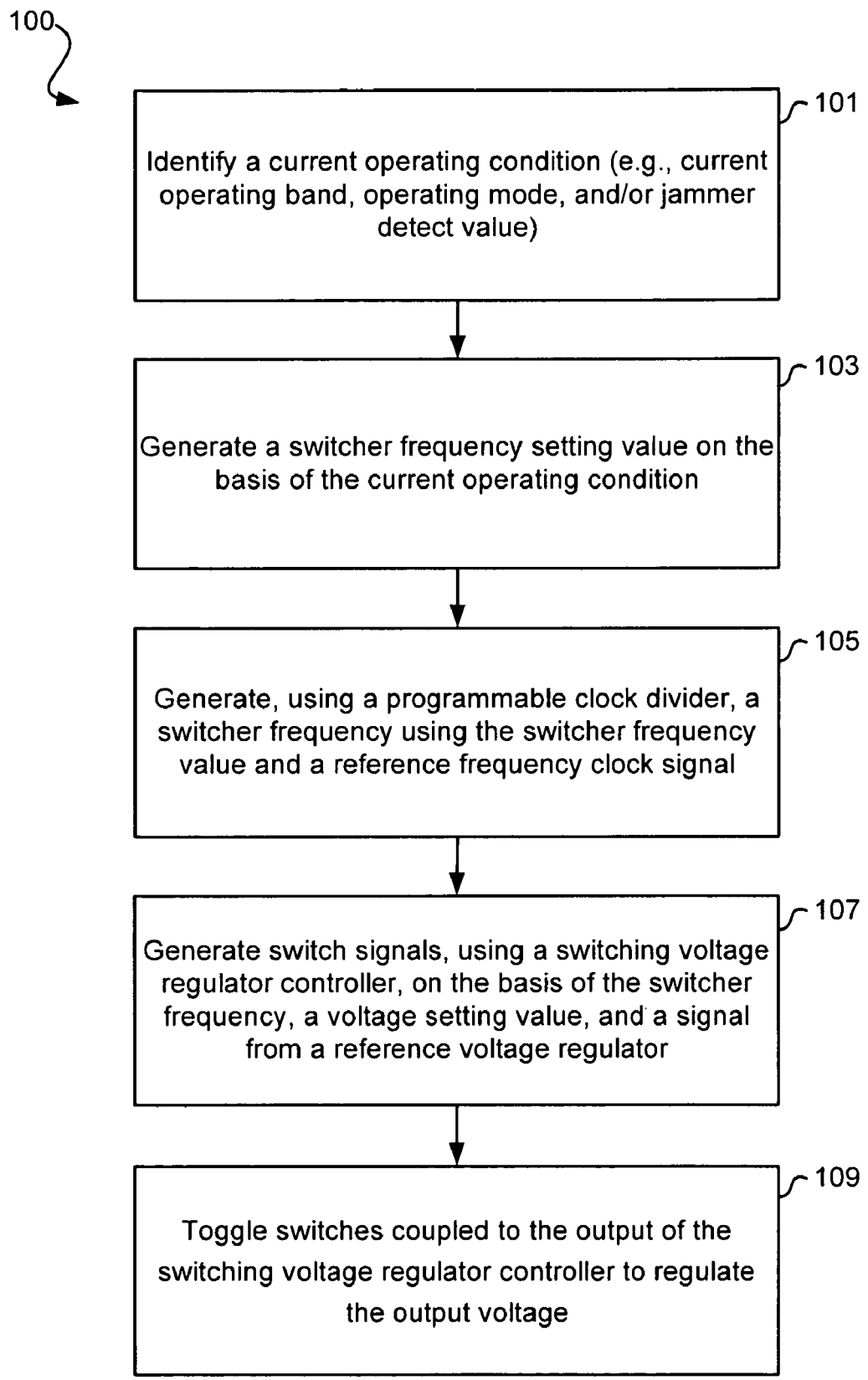
FIG. 9 is an operational flow diagram of the process of selecting a switcher frequency for a switching voltage regulator utilizing a switching voltage regulator controller in accordance with a preferred embodiment.

FIG. 9 is an operational flow diagram of the process of selecting a switcher frequency for a switching voltage regulator utilizing a switching voltage regulator controller in accordance with a preferred embodiment. Operation flow diagram 100 starts with processor 70 identifying the current operating condition (e.g., current operating band, operating mode, and/or jammer detect value) (block 101). Processor 70 then generates a switcher frequency setting value on the basis of the current operating condition (block 103). Programmable clock divider 64 receives and processes the switcher frequency setting value in combination with reference frequency clock signal, REF_CLK, and generates the desired switching frequency (block 105). Switching voltage regulator controller 63 receives the switching frequency from programmable clock divider 64, the voltage setting value, for example, from processor 70, and the signal from the reference voltage regulator 62, to generate switch signals (block 107). The switch signals are used to toggle switches (62a, 62b) which have the effect of regulating the output voltage of switching voltage regulator 40 (block 109). At any time, the operation flow diagram 100 may restart if the current operating condition changes (back to block 101). A more specific operation flow diagram for a multi-band CDMA wireless communication device is further described below.

Figure 10:
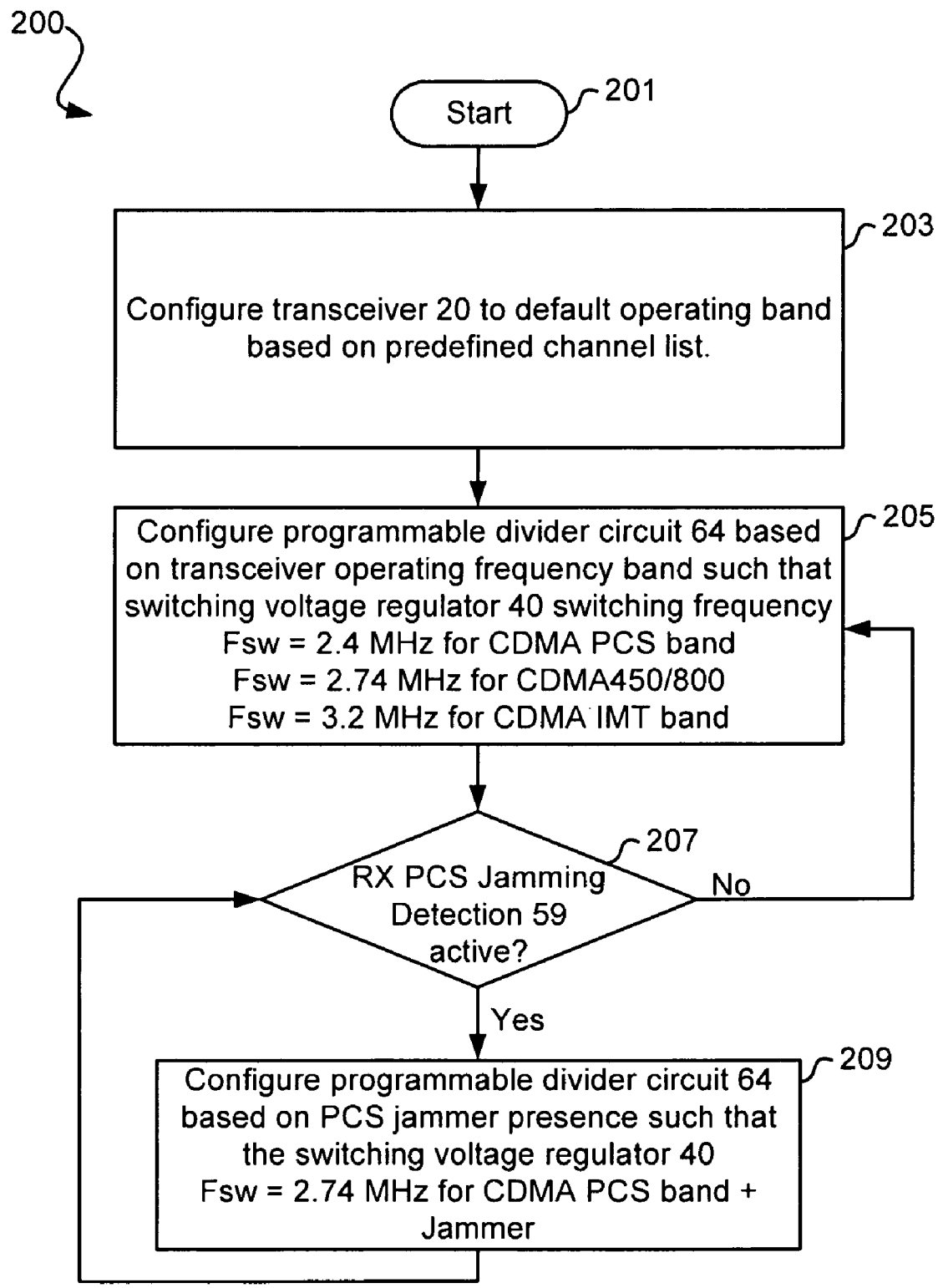
FIG. 10 is an operational flow diagram of the process of selecting an optimal switcher frequency, Fsw, for the switching voltage regulator in different operating frequency bands for CDMA mode in accordance with a preferred embodiment.

FIG. 10 is an operational flow diagram of the process of selecting an optimal switcher frequency, Fsw, for the switching voltage regulator in different operating frequency bands for CDMA mode accordance with a preferred embodiment. Operation flow diagram 200 starts with a start block (block 201) followed by programming one or more registers within the transceiver 20 for the particular operating band to be used (block 203). Once the operating band is determined, programmable clock divider 64, in switching voltage regulator 40, is set to one of three different values 6, 7, or 8 such that the switcher frequency (Fsw) of switching voltage regulator 40 is equal to either 2.4 MHz (CDMA PCS band), 2.74 MHz (CDMA450/800 band), or 3.2 MHz (CDMA IMT band) based on a reference clock frequency signal, REF_CLK, of 19.2 MHz (block 205).

The switcher frequency, Fsw, is calculated based multiple parameters. The first criterion is the desired channel bandwidth (Fch=1.23 MHz for CDMA). Fsw must be greater than half of Fch to insure that the switching noise does not directly couple into the baseband I/Q analog signals as shown in FIGS. 1, 2, 7, and 8. Table 1 below shows Fch for different operating modes. Additional operating modes may be included. Operational flow diagram 200 is simplified to one operating mode, CDMA. Additional criteria will require that the switcher frequency, Fsw, be adjusted to higher values when there is transmit signal leakage and/or jamming tones present at the receiver input.

TABLE 1

Example Modes of Operation and Channel Bandwidth (Fch)

| Operating Mode | Channel Bandwidth Fch |
|---|---|
| GSM/EDGE | 200 kHz |
| CDMA | 1.23 MHz |
| UMTS | 3.92 MHz |

The second criterion is that the transmit RF channel leakage (in a full duplex system such as CDMA) not corrupt the receive RF channel. As described previously, the RF LO Generation block 28 will be contaminated with switcher frequency voltage ripple and corresponding harmonic frequencies from switching voltage regulator 40. If a switcher frequency harmonic is at a frequency offset close to the frequency separation between transmit RF and receive RF channels, the particular switcher harmonic will mix with the transmit RF channel leakage at I/Q down-converter 55 (after the switcher frequency voltage ripple has coupled into the RF VCO 33 (RX_VCO and RX_LO signals) and generate receive signal processing interference. Likewise, switcher frequency voltage ripple and corresponding harmonic frequencies can couple to RF VCO within the TX LO Generation block 37 and create spurious content in the output of transmit signal processing block 22 of transceiver 20. This transmit spurious content can fall within the receive RF channel and create receive RF channel interference.

The receive RF channel to transmit RF channel separation for different operating bands is shown in Table 2 below. By insuring that Fsw satisfies the equation where |N*Fsw−D|>Fch/2 (where N is an integer), switcher frequency harmonics shall not directly couple into the receive baseband I/Q analog signals, RX_I and/or RX_Q as shown in FIGS. 7-8. To satisfy the equation above, Fsw must also be greater than Fch (not Fch/2).

TABLE 2

Example Bands of Operation and RX-TX Channel Separation (D)

| Operating Band | RX-TX Separation D |
| --- | --- |
| CDMA450 | 10 MHz |
| US Cellular | 45 MHz |
| US PCS | 80 MHz |
| IMT | 190 MHz |

The third criterion is based on the presence of jamming interference close in frequency to the desired receive RF channel. The fundamental switcher frequency (coupled onto RF VCO 33) can mix with the offset jamming tones (FJ1 at RF, J1 at baseband of FIG. 8) to create interference within the receive baseband channel bandwidth (RX_BB of FIG. 8) that cannot be filtered out or eliminated. The receive signal processing block 24 jamming specifications for different operating bands and modes may be applied such that the wireless device complies with the published minimum performance standards. In the case of CDMA, the jammer frequency offsets from the desired RX RF channel (J1 offset for single-tone tests or J1+J2 offsets for two-tone tests) are specified per the following operating bands as follows in Table 3.

TABLE 3

Jamming Offsets for Different CDMA Operating Bands (J1 or J1 + J2)

| CDMA Band | J1 Frequency Offset | J2 Frequency Offset |
| --- | --- | --- |
| CDMA450 | 900 kHz | 1.7 MHz |
| US Cellular | 900 kHz | 1.7 MHz |
| US PCS | 1.25 MHz | 2.05 MHz |
| IMT | 2.5 MHz | 4.9 MHz |

Assuming receive signal processing block 24 has a jamming detection circuit 59 (of FIG. 7), the switcher frequency may be adjusted such that Fsw>(J1 or J2)+Fch/2. Depending on the maximum switcher frequency allowed, J1 or J2 frequency offsets may be chosen from Table 3 for the above Fsw formula. The presence of jamming interference takes priority over TX signal leakage (second criterion) if there is no switcher frequency that satisfies both the second or third criteria.

Applying the three constraints while assuming a 19.2 MHz clock frequency signal, REF_CLK, is input to the programmable clock divider 64 (of FIG. 6), optimal switcher frequencies, Fsw, may be calculated for multiple operating conditions in CDMA mode and stored as shown in Table 4 below. 2.4 MHz is generated by dividing 19.2 MHz by 8, 2.74 MHz is generated by dividing 19.2 MHz by 7, and 3.2 MHz is generated by dividing 19.2 MHz by 6. In one embodiment, the switcher frequency values of 6, 7, and 8 are selected for different CDMA frequency bands with and without jammers.

TABLE 4

Switching Frequencies, Fsw, for Different CDMA Operating Bands with and without Jammer Interference

| CDMA Band | Without Jammers | With Jammers | Switcher Frequency Value |
| --- | --- | --- | --- |
| CDMA450 | 2.74 MHz | 2.74 MHz | 7 |
| US Cellular | 2.74 MHz | 2.74 MHz | 7 |
| US PCS | 2.4 MHz | 2.74 MHz | 8 (no jammer) 7 (with jammers) |
| IMT | 3.2 MHz | 3.2 MHz | 6 |

Once Fsw is programmed, jamming detection circuit 59 is either polled or used as an interrupt (block 107). When jammer detect signal is active (high logic level) in CDMA-PCS mode (according to Table 4), the switcher frequency (Fsw) is changed from 2.4 MHz to 2.74 MHz (block 109) by changing the switcher frequency value from 8 to 7. Once the jammer is no longer present, jammer detect transitions to a low logic level, and switcher frequency (Fsw) will be changed back to 2.4 MHz by changing the switcher frequency value to 8 (block 105 repeated) and jamming detection circuit 59 will continue monitoring (block 107, etc). Other switcher frequencies may be used depending on the available reference clock frequency signal, REF_CLK, and divider ratios for programmable clock divider 64 such that the three criteria are optimally met.

Those of skill in the art would understand that signals may be represented using any of a variety of different techniques. For example, data, instructions, signals that may be referenced throughout the above description may be represented by voltages, currents, electromagnetic waves, magnetic fields or particles, or any combination thereof.

Those of skill would further appreciate that the various illustrative radio frequency or analog circuit blocks described in connection with the disclosure herein may be implemented in a variety of different circuit topologies, on one or more integrated circuits, separate from or in combination with logic circuits and systems while performing the same functions described in the present disclosure.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. A device including a switching voltage regulator for generating an output voltage comprising:
    a programmable clock divider configured to generate a switcher frequency in response to a reference clock frequency signal and a switcher frequency setting value representative of at least a current operating mode condition; and
    a switching voltage regulator controller configured to regulate the output voltage in response to the switcher frequency generated by the programmable clock divider and a reference voltage, wherein:
        the switching voltage regulator controller compares the output voltage to the current operating mode condition and adjusts a duty cycle of one or more switches based on a result of the comparison, and
        the current operating mode condition is an operating mode selected from a distinct set of predetermined operating modes.

2. The device of claim 1, wherein the switcher frequency setting value is based in part on a receive channel bandwidth.

3. The device of claim 1, wherein the switcher frequency setting value is based in part on a transmit channel to receive channel frequency separation during full-duplex mode of operation.

4. The device of claim 1, further comprising a jamming detection circuit to generate a jammer detect value, wherein the switcher frequency setting value is further based in part on the jammer detect value.

5. The device of claim 4, wherein the jammer detect value represents the presence of jammers offset from the receive channel frequency.

6. The device of claim 5, further comprising a processor responsive to the jammer detect value for generating the switcher frequency setting value.

7. The device of claim 1, wherein the device is an integrated circuit.

8. An integrated circuit (IC) for generating an output voltage for a switching voltage regulator comprising:
    a programmable clock divider configured to generate a switcher frequency in response to a reference clock frequency signal and a switcher frequency setting value representative of at least a current operating mode condition; and
    a switching voltage regulator controller configured to regulate the output voltage in response to the switcher frequency generated by the programmable clock divider and a reference voltage, wherein:
        the switching voltage regulator controller compares the output voltage to the current operating mode condition and adjusts a duty cycle of one or more switches based on a result of the comparison, and
        the current operating mode condition is an operating mode selected from a distinct set of predetermined operating modes.

9. The IC of claim 8, wherein the switcher frequency setting value is based in part on a receive channel bandwidth.

10. The IC of claim 8, wherein the switcher frequency setting value is based in part on a transmit channel to receive channel frequency separation during full-duplex mode of operation.

11. The IC of claim 8, further comprising a jamming detection circuit to generate a jammer detect value, wherein the switcher frequency setting value is further based in part on the jammer detect value.

12. The IC of claim 11, wherein the jammer detect value represents the presence of jammers offset from the receive channel frequency.

13. The IC of claim 12, further comprising a processor responsive to the jammer detect value for generating the switcher frequency setting value.

14. A device for generating an output voltage for a switching voltage regulator comprising:
    means for generating a switcher frequency in response to a reference clock frequency signal and a switcher frequency setting value representative of at least a current operating mode condition; and
    means for regulating the output voltage in response to the switcher frequency generated by the programmable clock divider and a reference voltage,
    wherein the means for generating a switcher frequency comprises:
        means for comparing the output voltage to the current operating mode condition selected from a distinct set of predetermined operating modes; and
        means for adjusting a duty cycle of one or more switches based on a result of the comparison.

15. The device of claim 14, wherein the switcher frequency setting value is based in part on a receive channel bandwidth.

16. The device of claim 14, wherein the switcher frequency setting value is based in part on a transmit channel to receive channel frequency separation during full-duplex mode of operation.

17. The device of claim 14, further comprising means for generating a jammer detect value, wherein the switcher frequency setting value is further based in part on the jammer detect value.

18. The device of claim 17, wherein the jammer detect value represents the presence of jammers offset from the receive channel frequency.

19. The device of claim 18, further comprising means responsive to the jammer detect value for generating the switcher frequency setting value.

20. A method of regulating an output voltage of a switching voltage regulator, comprising:
  identifying a current operating condition;
  generating a switcher frequency setting on the basis of the current operating mode condition selected from a distinct set of predetermined operating modes;
  generating, using a programmable clock divider, a switcher frequency using the switcher frequency setting value and a reference frequency clock signal;
  generating switch signals, using a switching voltage regulator controller, on the basis of at least the switcher frequency generated by the programmable clock divider; and
  toggling switches coupled to the output of the switching voltage regulator controller to regulate the output voltage,
  wherein generating a switcher frequency includes comparing the output voltage to the current operating mode condition and adjusting a duty cycle of one or more switches based on a result of the comparison.

21. The method of claim 20, wherein the switcher frequency setting value is based in part on a receive channel bandwidth.

22. The method of claim 20, wherein the switcher frequency setting value is based in part on a transmit channel to receive channel frequency separation during full-duplex mode of operation.

23. The method of claim 20, further comprising generating a jammer detect value, wherein the switcher frequency setting value is further based in part on the jammer detect value.

24. The method of claim 23, wherein the jammer detect value represents the presence of jammers offset from the receive channel frequency.

25. The method of claim 24, further comprising generating the switcher frequency setting value in response to the jammer detect value.

26. A processor configured for operation with a jamming detection circuit and a switching voltage regulator, comprising:
  means for receiving a jammer detect value from the jamming detection circuit;
  means for receiving a value representative of a current operating mode condition selected from a distinct set of predetermined operating modes; and
  means for generating a switcher frequency setting value in response to the jammer detect value and value representative of the current operating mode condition, the switcher frequency setting value being associated with an operating switching frequency of the switching voltage regulator,
  wherein means for generating a switcher frequency setting value comprises means for comparing the output voltage to the current operating mode condition and adjusting a duty cycle of one or more switches based on a result of the comparison.

27. A computing device configured for operation with a jamming detection circuit and a switching voltage regulator comprising:
  a memory; and
  a processor coupled to the memory, wherein the processor is configured with processor-executable instructions to perform operations comprising:
    receiving a jammer detect value from the jamming detection circuit;
    receiving a value representative of a current operating mode condition selected from a distinct set of predetermined operating modes; and
    generating a switcher frequency setting value in response to the jammer detect value and the value representative of the current operating mode condition, the switcher frequency setting value being associated with an operating switching frequency of the switching voltage regulator,
  wherein the processor is configured with processor-executable instructions such that the output voltage is compared to the current operating mode condition and a duty cycle of one or more switches is adjusted based on a result of the comparison.

28. A non-transitory computer readable storage medium having stored thereon processor executable software instructions configured to cause a wireless communication device processor to perform operations comprising:
  identifying a current operating condition;
  generating a switcher frequency setting on the basis of the current operating mode condition selected from a distinct set of predetermined operating modes;
  generating a switcher frequency, using a programmable clock divider, in response to the switcher frequency setting value and a reference frequency clock signal;
  generating switch signals, using a switching voltage regulator controller, in response to the switcher frequency generated by the programmable clock divider and a reference voltage; and
  toggling switches coupled to the output of the switching voltage regulator controller to regulate output voltage in response to the switch signals,
  wherein generating switch signals includes comparing the output voltage to the current operating mode condition and adjusting a duty cycle of one or more switches based on a result of the comparison.

29. The non-transitory computer readable storage medium of claim 28, wherein the stored processor-executable software instructions are configured to cause a processor to perform operations comprising:
  generating a switcher frequency setting based in part on a receive channel bandwidth.

30. The non-transitory computer readable storage medium of claim 28, wherein the stored processor-executable software instructions are configured to cause a processor to perform operations comprising:
  generating a switcher frequency setting based in part on a transmit channel to receive channel frequency separation during full-duplex mode of operation.

31. The non-transitory computer readable storage medium of claim 28, wherein the stored processor-executable software instructions are configured to cause a processor to perform operations comprising:
  generating a jammer detect value, wherein the switcher frequency setting value is further based in part on the jammer detect value.

32. The non-transitory computer readable storage medium of claim 31, wherein the stored processor-executable software instructions are configured to cause a processor to perform operations such that the jammer detect value represents the presence of jammers offset from the receive channel frequency.

33. The non-transitory computer readable storage medium of claim 32, wherein the stored processor-executable software instructions are configured to cause a processor to perform operations comprising:
  generating the switcher frequency setting value in response to the jammer detect value.

* * * * *